United States Patent [19]

Spevack

[11] 4,008,046
[45] Feb. 15, 1977

[54] DUAL TEMPERATURE EXCHANGE APPARATUS

[75] Inventor: Jerome S. Spevack, New Rochelle, N.Y.

[73] Assignee: Deuterium Corporation, White Plains, N.Y.

[22] Filed: Aug. 14, 1974

[21] Appl. No.: 497,451

Related U.S. Application Data

[62] Division of Ser. No. 126,623, March 22, 1971, Pat. No. 3,872,223.

[52] U.S. Cl. .................... 23/270.5 W; 423/563; 423/580
[51] Int. Cl.² ................ B01D 11/04; C01B 4/00
[58] Field of Search ............. 23/270.5 W; 423/580, 423/563

[56] References Cited

UNITED STATES PATENTS

| | | | |
|---|---|---|---|
| 2,952,525 | 9/1960 | Harteck | 23/270.5 W |
| 3,549,324 | 12/1970 | Babcock | 23/283 X |
| 3,549,325 | 12/1970 | Babcock | 23/283 X |
| 3,685,966 | 8/1972 | Thayer | 423/563 |
| 3,692,477 | 9/1972 | Thayer | 23/270.5 W |
| 3,907,500 | 9/1975 | Spevack | 423/580 |
| 3,907,508 | 9/1975 | Spevack | 423/580 |

Primary Examiner—Norman Yudkoff
Assistant Examiner—Barry I. Hollander
Attorney, Agent, or Firm—Hall & Houghton

[57] ABSTRACT

A dual temperature final enrichment system which, e.g., can effect the further enrichment of the previously augmented deuterium content of water from a concentration of 1 mol percent to a desired concentration of up to 99.8 mol percent; and a product finishing system which can remove dissolved contaminants from such enriched water to provide a high purity product.

10 Claims, 3 Drawing Figures

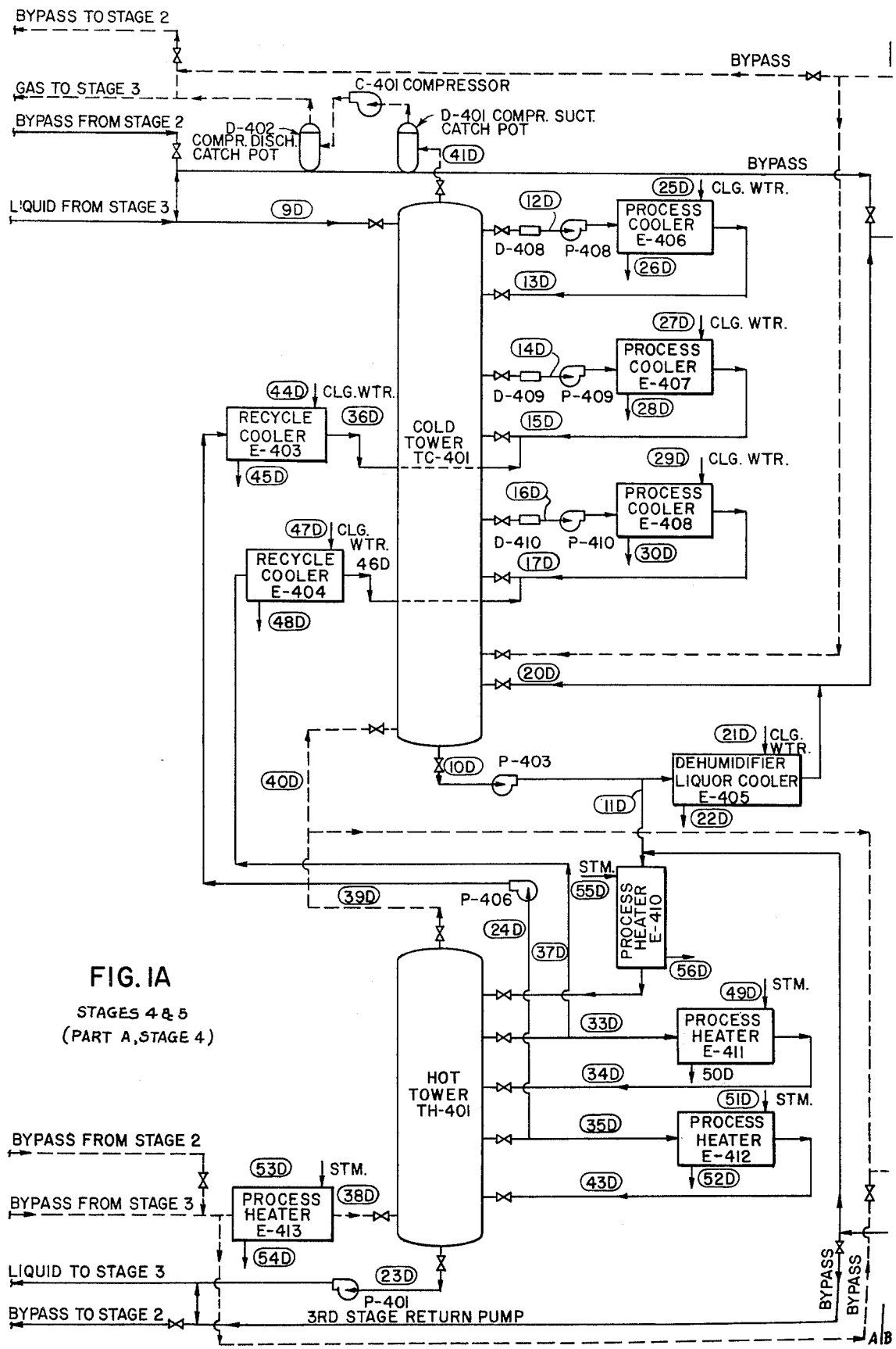
FIG. IA
STAGES 4 & 5
(PART A, STAGE 4)

STAGES 4 & 5
(PART B, STAGE 5)

PRODUCT FINISHING

IMPROVEMENTS IN DUAL TEMPERATURE EXCHANGE APPARATUS

This is a division of application Ser. No. 126,623 filed Mar. 22, 1971 (U.S. Pat. No. 3,872,223 issued Mar. 18, 1975).

BACKGROUND OF THE INVENTION

1. Field of Invention

This application relates to improvements in enrichment systems and is more particularly concerned with improvement of the final stages of a dual temperature water-hydrogen sulfide exchange system for the production of deuterium oxide (heavy water) and the product finishing stage thereof.

2. Description of the Prior Art

In the prior art, the practice in the production of heavy water has been to conduct the final stages of enrichment by water distillation and/or electrolysis. Statements have been made in the literature that the final enrichment operations might be carried out by the dual temperature exchange process, but such has not actually been performed.

SUMMARY OF THE INVENTION

The present invention aims to provide a dual temperature final enrichment system which can carry the enrichment of the deuterium content of water from a concentration of 1 mol percent or more to a desired final enrichment of up to 99.8 mole percent, as $D_2O$ (deuterium oxide), and to a product finishing system which can remove dissolved inorganic and/or organic contaminants to provide a pure product.

DESCRIPTION OF PREFERRED EMBODIMENTS

Figure 1B:
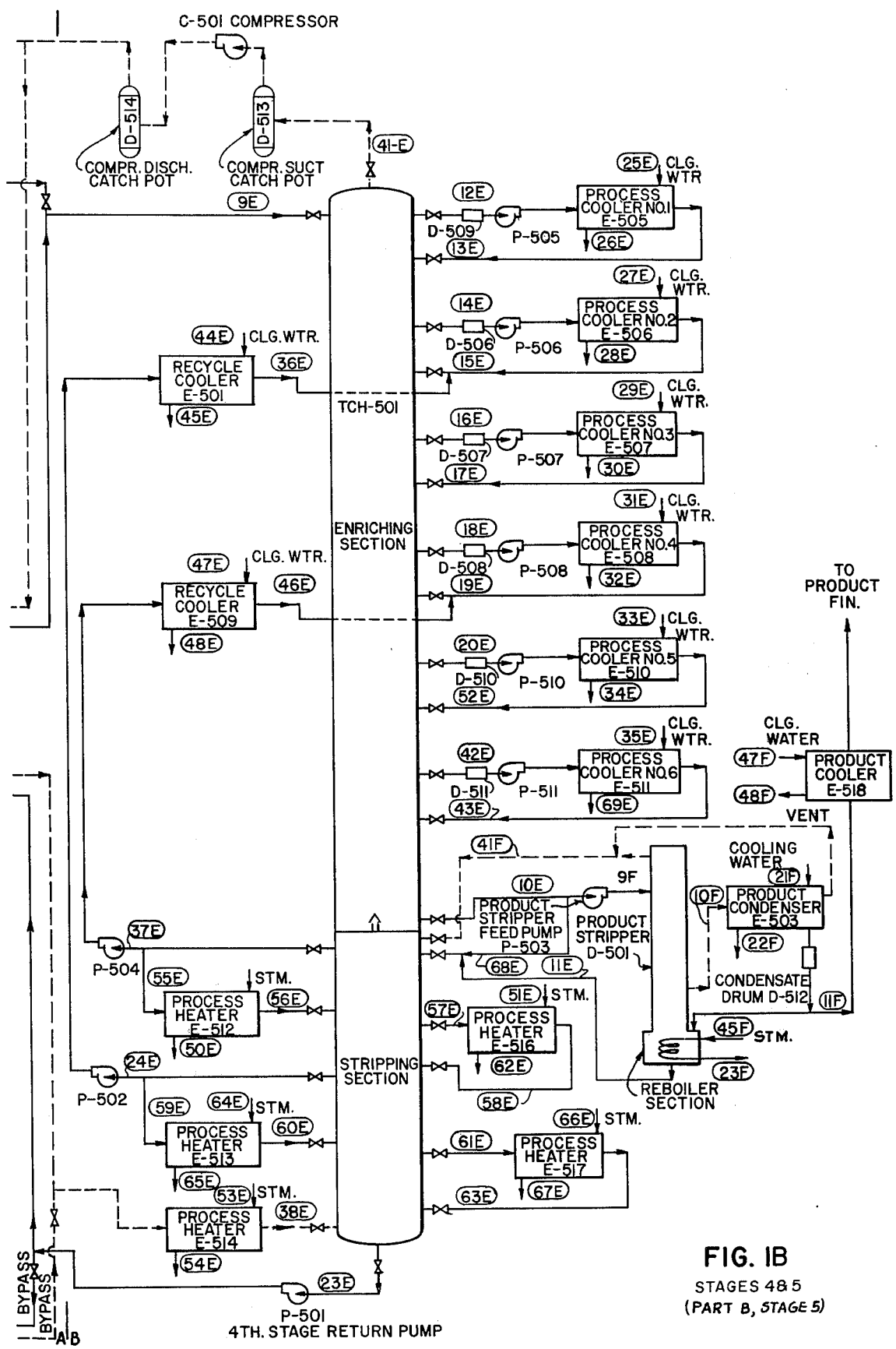
FIG. 1 is a simplified flow diagram of a dual temperature final enrichment stage according to the invention.
Figure 2:
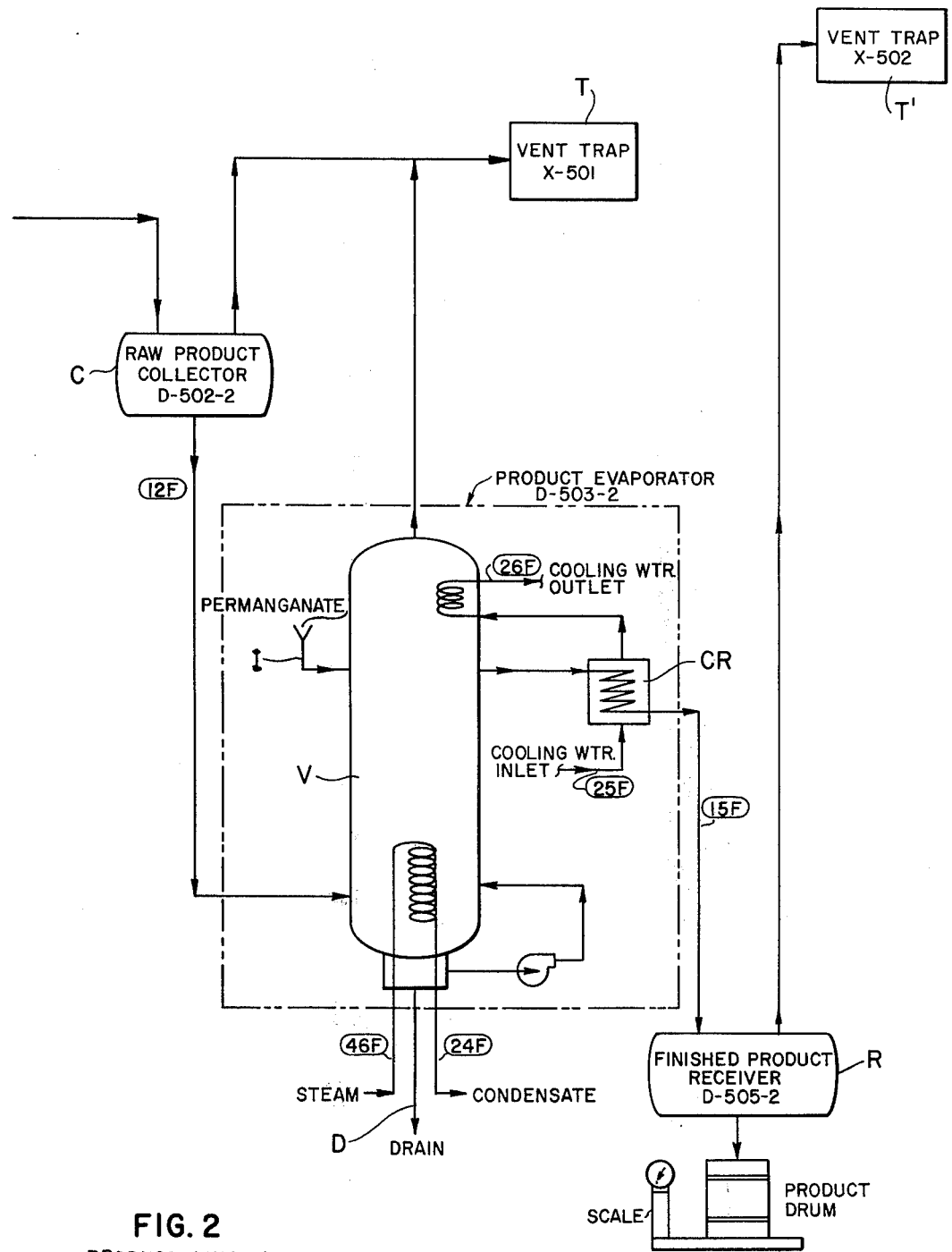
FIG. 2 is a modified flow diagram of a product finishing system suitable for employment therewith.

The embodiments shown in FIGS. 1 and 2 of the drawings is particularly adapted to receive water and hydrogen sulfide partially enriched in deuterium content by prior stages of a dual temperature exchange system, e.g., the three stage system described in my copending application Ser. No. 126692 filed concurrently herewith (U.S. Pat. No. 3,860,698 issued Jan. 14, 1975), and herein incorporated by reference, whereby enrichment to a concentration of deuterium from about 7 to 15 mole percent, as $D_2O$ is attained, and accordingly the stages of the preferred embodiment of FIG. 1 herein are designated as the fourth and fifth stages.

Referring to FIG. 1 of the accompanying drawings:

Stage 4 comprises a hot tower TH-401 and a cold tower TC-401 operating in conjunction with an $H_2S$ compressor C-401 and various process water pumps and process coolers and heaters substantially as shown.

The stage 4 hot tower is a vertical pressure vessel approximately 30 inches in diameter and approximately 121 feet high, consisting entirely of a water impoverishing section. The cold tower vessel is a vertical pressure vessel approximately 30 inches in diameter and approximately 140 feet high consisting of the cold tower or water enriching section and an integral dehumidification tower section thereunder extending below the inlet of pipe 20D. Both towers ae made of carbon steel and contain stainless-steel sieve trays.

Due to the smaller flow volumes and greater concentration ranges in stage 4 as compared to prior enrichment stages of the dual temperature system, effects of isotopic heat given off in the exchange reactions, $H_2O + HDS \rightleftharpoons HDO + H_2S$ and $HDO + D_2S \rightleftharpoons D_2O + HDS$, become critical making it necessary to include exothermal coolers for the process fluids in the cold tower in the preferred practice of the present invention and heaters for the process fluids in the hot tower. Unlike the preceding stages, stage 4 does not include any heat recovery exchangers.

Deuterium-enriched $H_2S$ gas from the stage 3 hot towers is heated in the heater E-413 in conduit 38D and passed into the bottom of the stage 4 hot tower. The gas passes upward through the tower, stripping deuterium from the countercurrent flow of process water. The gas leaves the top of the hot tower 39D and is split into two streams, one of which flows via 38E to the bottom of the hot tower section of the stage 5 tower TCH-501 and the other, being the major stream enters the bottom of the stage 4 cold tower via 40D.

The $H_2S$ gas passes upward to the cold tower TC-401 through the dehumidification section in countercurrent direct contact with the circulation of cold water between 20D and 10D. The cooled, dehumidified gas passes through the cold tower water enriching section, transferring its deuterium to the countercurrent flow of process water therein. Gas recycled from stage 5 joins the main gas flow at the bottom of the cold tower just above 20D. The gas leaves the top of the cold tower via 41D and is pumped by the stage 4 gas compressor C-401 via 41D to the bottom of the stage 3 cold tower. Under circumstances of impaired third stage operation, the gas flow is split into two streams with part passing to the stage 3 cold tower and the rest bypassed to the bottom of the stage 2 cold tower or the entire flow may be diverted to stage 2.

The deuterium-enriched process water from stage 3 via 9D is discharged into the top of the stage 4 cold tower where the water flows downward picking up deuterium from the countercurrent flow of $H_2S$ gas. The deuterium-enriched water then flows downward through the dehumidification section located thereunder, merging with the dehumidification water circulation from 20D. Condensate formed in the dehumidifier from the cooling of the gas becomes part of the water flow in the dehumidification section.

The process water flow in the cold tower is withdrawn at three separate enrichment levels and each of the three streams is pumped (by pumps P-408, P-409 and P-410 respectively) through a process cooler E-406, E-407 and E-408, respectively, from which the stream is returned via 13D, 15D and 17D to the tower immediately below the seal tray from which it was withdrawn. A level chamber 12D, 14D and 16D, on the intake side of each pump permits steady liquid flow to each process cooler and also prevents the pump from running dry. In addition, two separate process water streams are recycled from different levels of impoverishment in the hot tower TH-401 and are merged with the stream of cooled process water reentering the cold tower of substantially similar deuterium concentration.

The deuterium-enriched process water from the cold tower TC-401 is withdrawn via 10D from the bottom of the dehumidification section thereunder. The flow, pumped by pump P-403 is split into two streams, one part is passed to a dehumidifier liquor cooler E-405 and recycled via 20D to the top of the dehumidification section and the other part after merging with process water returned via 23E from the bottom of the hot tower section of stage 5, is passed through heater E-410 from which the heated water enters the top of the hot tower TH-401. This enriched water flows downward across the sieve trays in the hot tower and is stripped of deuterium by the countercurrent flow of gas. The impoverished water is withdrawn via 23D from the bottom of the hot tower and returned by pump P-401 to the top of the stage 3 hot tower.

Process water flow in the hot tower is withdrawn at two separate levels of impoverishment in the tower. A portion via 37D of the upper or less impoverished stream passes to recycle cooler E-404 and via 46D is recycled to the cold tower and merged with the returning cooled cold tower water flow at 17D, and the rest passes via 33D through heater E411 and via 34D reenters the hot tower. A portion via 24D of the lower or more impoverished stream is pumped by the pump P-406 to the recycle cooler E-403 and via 36D is recycled to the cold tower and merged with the returning cooled cold tower water flow at 15D, and the remainder passes via 35D through heater E-403 and via 43D reenters the hot tower. By these arrangements, the proportionate amount of process water or first fluid phase in contact with the gas or second fluid phase is increased in a part of the hot tower upstream, in relation to said first fluid phase, of said means for increasing, e.g., 35D and/or 33D; and the proportionate amount of process water or first fluid phase in contact with the gas or second fluid phase is decreased in a part of the cold tower upstream, in relation to said first fluid phase, of said means for decreasing, e.g., said means 36D, 15D and/or 46D, 17D.

Process water passing down through the dehumidification section under the cold tower TC-401 is heated while cooling and dehumidifying the countercurrent flow of hot saturated $H_2S$ therein from the hot tower TH-401. The water, withdrawn via 10D from the bottom of the dehumidifier section, is pumped by pump P-403, in part to the dehumidifier recycle liquid cooler P-405 and a portion of the so called water is passed via 9E to the top of the cold tower enriching section of stage 5 tower TCH-501. The major part of the water pumped by P-403 is recycled to the cold tower dehumidification section.

Stage 5 contains a single tower TCH-501 comprising the cold tower or enriching section on top of a dehumidification section which in turn is constructed on top of the hot tower or stripping section. This unit operates in conjunction with $H_2S$ compressor C-501 and various process water pumps, process fluid coolers and a product stripper, substantially as shown.

The stage 5 tower is a vertical pressure vessel made of stainless steel. It is approximately 30 inches in diameter and 120 feet high. High efficiency packing is used instead of sieve trays throughout the tower.

Deuterium enriched gas from the stage 4 hot tower, divided from the flow via 39D, is heated in heater E-514 and passed via 38E into the bottom of the hot water stripping section of the stage 5 tower. The gas passes upward therein becoming enriched while stripping deuterium from the countercurrent flow of process water. A flow of $H_2S$ gas, via 41F, from the product stripper D-501 joins the enriched gas at the top of the stripping section. The $H_2S$ gas passes from the hot water stripping section into the dehumidification section where it is cooled and dehumidified by the countercurrent flow of process water therein. The cooled enriched gas flows into the cold tower water enriching section and continues upward, transferring its deuterium to the descending process water. The impoverished $H_2S$ gas leaving the top of the tower via 41E is pumped by gas compressor C-501 into the bottom of the stage 4 cold tower.

Deuterium enriched process water from stage 4 enters the top of the stage 5 tower via 9E. The water flows downward in the cold enriching section, picking up deuterium from the countercurrnt flow of deuterium enriched $H_2S$ gas. To counteract the heating effect of the exothermic deuterium exchange reaction in this section the warmed process water is withdrawn from the tower at six separate levels of enrichment, and each stream is pumped to a cooler, E-505 to E-511, and then returned to the tower. Level chambers, e.g., 12E, on the intake side of each pump, e.g. P-505, permit steady water flow to each cooler and prevent the pumps from running dry. Two hot process water streams of different intermediate concentration are withdrawn from the stripping section, are separately cooled in coolers E-509 and E-501, respectively, and each is merged with the recycled cooled process water stream of corresponding concentration at the enriching section, e.g., at 19E and 15E respectively.

Deuterium enriched process water is withdrawn via 10E from the bottom of the dehumidification section of tower TCH-501. A major portion via 68E is merged with a hot purge stream via 11E from the bottom of the reboiler section of the product stripper D-501 and passed into the top of the stage 5 tower stripping section. The remainder is passed via 9F by pump P-503 to the product stripper D-501 for removal of dissolved $H_2S$ and primary purification by distillation.

The enriched process water from the dehumidifier sections in the tower is passed downward through the stripping section where it transfers it deuterium to the countercurrent flow of $H_2S$ gas therein. To counteract the cooling effect of the endothermic deuterium exchange reaction in this section, the cooled process water is withdrawn from the tower at four separate levels of impoverishment. Each section is pumped, e.g., by P-504 to a heater, e.g., E-512, and then returned to the tower. A portion of each of two of the streams 37E and 24E, is pumped to a cooler, E-509 and E-501, respectively, and passed to the cold water enriching section and these merged with the entering recycle flow of the cooled process water of corresponding concentration, e.g., 15E and 19E respectively.

The product stripper D-501 is a stainless steel pressure vessel consisting of a reboiler section and hydrogen sulfide stripping section. The stripping section is packed with ½ inch Raschig rings.

Highly enriched process water comprising substantially pure $D_2O$ from the bottom of the dehumidification section is pumped to the top of the stripping section of the product stripper and $D_2S$ and/or HDS is removed as the water passes downward counter to the upward flow of water vapor therein. The vapor is generated in the reboiler section at the bottom of the unit by evaporation with heat supplied by a steam heated tubular coil therein. The enriched $H_2S$ stripped from the product together with $D_2O$ vapor are passed via 41F to the bottom of the dehumidification section. A liquid purge stream is withdrawn from the bottom of the reboiler section to prevent the buildup of soluble salts, and is returned via 11E to the top of the stripping section of the stage 5 tower. Deuterium oxide or heavy water vapor is withdrawn via 10F from below the packed stripping section and passed to the product condenser E-503.

A portion of the condensate of distilled heavy water withdrawn from the condenser is recycled to the reboiler section and the remainder is passed to a product cooler E-518 and then to the product finishing system. Uncondensed vapor and non-condensables are vented from the top of the condenser and are recycled with the enriched $H_2S$ from the stripping section of the product stripper via 41F to the stage 5 tower.

The purpose of the product finishing system is to purify the heavy water by distillation and chemical treatment so that it will meet the high-purity requirements. The system preferably consists of two identical sections installed in parallel, in that one may be available for stand-by. Each system includes a raw product collector, C, a product evaporator vessel V, and a finished product receiver R. A portable scale is used to weigh the finished product.

The distilled heavy water condensate product from stae 5 continuously enters the system at the top of the stainless-steel raw product collector C. During the distillation operation, raw product passes to the product evaporator vessel. There is a 30 gallon stainless steel unit consisting of a lower evaporator section and an upper combined high-purity condenser section. A steam coil provides heat for distilling the raw product.

Heavy water vapor passes from the evaporator section at the lower part of Vessel V to the high-purity condenser section at the upper part of Vessel V where it is condensed. The product passes as vapor from the zone between said evaporator and condenser sections to the product cooler CR, where it is condensed to a liquid there being reflux and backwashing from the condensate formed in the upper condensing section of the vessel V. The cooled product is passed through a conductivity cell in line 15F (cell not shown) which monitors its purity; a product with higher electrolyte concentration than is desired is returned to the evaporator section by suitable means (not shown).

Potassium permanganate is added via inlet I at the top of the evaporator section to oxidize any organic matter or other oxidizable contaminants carried over in the vapor phase via 10F (FIG. 1) or otherwise gaining access to the vessel V. The spent permanganate is periodically removed via drain connection D.

The concentrated product is withdrawn into the finished product receiver. It is periodically discharged into product drums and weighed. The collector C and vessel V and receiver R are vented to refrigerated trap T to prevent loss of valuable heavy water vapor.

While there have been described herein what are at present considered preferred embodiments of the invention, it will be obvious to those skilled in the art that modifications, including changes and omissions and substitutions, may be made without departing from the essence and principle of the invention. It is therefore to be understood that the exemplary embodiments are illustrative and not restrictive of the invention, the scope of which is defined in the appended claims, and that all modifications that come within the meaning and range of equivalency of the claims are intended to be described and included therein.

I claim:
1. In an apparatus for producing a fluid phase containing a first material concentrated therein, by exchanging at two different temperatures said first material with a second material between chemically different first and second fluid phases which are physically separable from each other and which are each capable of containing each of said materials, said apparatus being of the type which comprises:
 a. first and second direct contact exchange units forming a pair,
 b. means connected to said exchange units for passing said second fluid phase through each of said second and first exchange units, in that order, of said pair,
 c. means connected to said exchange units for causing said first fluid phase to flow in countercurrent contact with said second fluid phase in each of said first and second units of said pair,
 d. means, comprising cooling means for one of said units and heating means for the other of said units, for maintaining said first and second units at different temperatures to cause (1) said second fluid phase to become progressively enriched in said first material in said second unit, and to become progressively impoverished in said first material in said first unit of said pair; and (2) said first fluid phase to become progressively enriched in said first material in said first unit and to become progressively impoverished in said first material in said second unit of said pair of units, and
 e. means connected to said units for withdrawing from the apparatus at least one enriched fluid passing from said units,
the improvement which comprises, in combination with the foregoing,
 f. means connected to said second unit for increasing the proportionate amount of first fluid phase in contact with the second fluid phase in a part of said second unit upstream, in relation to said first fluid phase flow, of said means (f), and
 g. means connected to said first unit for decreasing the proportionate amount of first fluid phase in contact with the second fluid phase in a part of said first unit upstream, in relation to said first fluid phase flow, of said means (a).

2. An improved apparatus as claimed in claim 1, wherein
 h. the means referred to in clauses (f) and (g) are connected to the respective units at levels therein at which the first fluid phase in the first unit and the first fluid phase in the second unit contain substantially similar concentrations of the first material.

3. An improved apparatus as claimed in claim 2, wherein
 i. the means for effecting the increase referred to in clause (f) comprises means for withdrawing first fluid phase from said second unit; and the means for effecting the decrease referred to in clause (g) comprises means for adding first fluid phase to said first unit.

4. An improved apparatus as claimed in claim 3, further comprising,
 j. means interconnecting the means referred to in clauses (f) and (g) for adding to the first unit first fluid phase withdrawn from the second unit at said respective levels.

5. An improved apparatus as claimed in claim 4, wherein said apparatus comprises a plurality of the means referred to in clause (f) connected to said second unit at different levels of enrichment therein, and also a plurality of the means referred to in clause (g) connected to said first unit at different levels of impoverishment therein.

6. An improved apparatus as claimed in claim 1, wherein said apparatus comprises a plurality of the means referred to in clause (f) connected to said second unit at different levels of enrichment therein, and also a plurality of the means referred to in clause (g) connected to said first unit at different levels of impoverishment therein.

7. An improved apparatus as claimed in claim 1, particularly adapted for the conduct of exchange reactions which are exothermic in said first unit and endothermic in said second unit, further comprising in said means (d)
- h. means connected to the first unit for removing from the fluids in the first unit, at at least one intermediate enrichment level therein, sensible heat imparted thereto by said exothermic reaction, and
- i. means connected to the second unit for adding heat to the fluids in the second unit, at at least one intermediate enrichment level therein, to replace sensible heat extracted therefrom by said endothermic reaction.

8. An improved apparatus as claimed in claim 1, particularly adapted for the conduct of exchange reactions wherein the first material is deuterium, the first fluid is water and the second fluid is another compound of hydrogen partially soluble in but physically separable from said water, and the pair of units referred to in clause (a) constitutes a first pair of units to which liquid water having a deuterium content in the range of from 1 to about 15 mol percent as $D_2O$ is supplied as first fluid, and wherein the enriched fluid withdrawn by the means (e) comprises first fluid, said apparatus further comprising:
- h. a second pair of first and second units corresponding to said first pair and having means corresponding to the aforesaid means (b) through (g) correspondingly connected thereto, and to which the said enriched fluid withdrawn from the first pair of units by the means (e) is delivered for further enrichment in said second pair,
- i. the means corresponding to means (e) connected to withdraw further enriched liquid water from said second pair having connected thereto stripper means for passing a flow of the withdrawn further enriched liquid water in countercurrent contact with a gaseous flow of vapor thereof, whereby second fluid dissolved in said liquid water is transferred to the gaseous flow and a portion of said water vapor is condensed into said flow of further enriched liquid water,
- j. said stripper means comprising (1) boiler means for evaporating a part of the said flow of further enriched liquid water containing said condensate for forming enriched water vapor and leaving a liquid water remainder thereof, (2) means for dividing the enriched water vapor produced by said boiler means into two flows and transferring the first of said two flows as a product water vapor stream therefrom, thereby leaving the second of said two flows to constitute the gaseous flow of vapor referred to in clause (i), and (3) discharge means connected thereto for discharging the gaseous flow of vapor therefrom after said countercurrent contact,
- k. means connected to the discharge means of said stripper means and to said pair of units for returning, to the flow of second fluid to be impoverished in the first unit of said second pair of units, the gaseous flow of vapor discharged by said discharge means; and
- l. means connected to said boiler means and to the second unit of said second pair of units for returning, to the flow of first fluid to be impoverished in the second unit of said second pair of units, the liquid water remainder referred to in clause (j).

9. An improved apparatus as claimed in claim 8, said apparatus further comprising,
- m. condenser means connected to said stripper means for receiving and condensing the product water vapor stream transferred therefrom; and
- n. delivery means connected to said condenser means for delivering condensate therefrom as distilled liquid water product.

10. An improved apparatus as claimed in claim 9, said apparatus further comprising
- o. product evaporator means connected to said delivery means, and comprising means for re-distilling under reflux the distilled liquid water product delivered thereby, and for condensing the vapor backwashed by said reflux, and delivering the same as finished product.

* * * * *